United States Patent
Wu et al.

(10) Patent No.: US 7,319,690 B2
(45) Date of Patent: Jan. 15, 2008

(54) COMMUNICATION SIGNAL EQUALIZATION SYSTEMS AND METHODS

(75) Inventors: Shiquan Wu, Nepean (CA); Wen Tong, Ottawa (CA); Claude Royer, Hull (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 687 days.

(21) Appl. No.: 10/912,241

(22) Filed: Aug. 6, 2004

(65) Prior Publication Data

US 2005/0041574 A1 Feb. 24, 2005

Related U.S. Application Data

(60) Provisional application No. 60/493,331, filed on Aug. 8, 2003.

(51) Int. Cl.
*H04B 7/216* (2006.01)
(52) U.S. Cl. ............. 370/342; 370/208; 370/210; 370/480; 375/260; 455/506
(58) Field of Classification Search ........... 455/506, 455/65, 418, 419, 67.11; 370/208; 375/260, 375/295
See application file for complete search history.

(56) References Cited

U.S. PATENT DOCUMENTS

| | | | |
|---|---|---|---|
| 6,377,632 B1 | 4/2002 | Paulraj et al. | |
| 2003/0043887 A1 | 3/2003 | Hudson | |
| 2003/0081763 A1* | 5/2003 | Tang et al. | 379/406.01 |
| 2004/0013084 A1 | 1/2004 | Thomas et al. | |
| 2004/0264561 A1* | 12/2004 | Alexander et al. | 375/232 |
| 2006/0050626 A1* | 3/2006 | Yucek et al. | 370/208 |
| 2006/0159187 A1* | 7/2006 | Wang et al. | 375/260 |
| 2006/0203932 A1* | 9/2006 | Palanki et al. | 375/295 |
| 2007/0132606 A1* | 6/2007 | Reckmann et al. | 340/855.4 |
| 2007/0133393 A1* | 6/2007 | Bocquet | 370/210 |

OTHER PUBLICATIONS

"White Paper: Frequency Domain Equalization for Single-Carrier Broadband Wireless Systems"; David Falconer, Lek Ariyavisitakul, Anader Benyamin-Seeyar, and Brian Eidson; Feb. 15, 2002; Retrieved from the Internet <URL: http://www.sce.carleton.ca/bbw/papers/whitepaper2.pdf>.
Swindlehurst, et al. "Direct Semi-Blind Symbol Estimation for MultipathChannels". Conference Record of the Thirty-Second Asilomar Conference on Signals, Systems and Computers, 1998, vol. 2, pp. 1124-1128, Nov. 1-4, 1998.
Witschnig, et al. "A Different Look on Cyclic Prefix for SC/FDE". The 13th IEEE International Symposium on Personal, Indoor, and Mobile Radio Communications, 2002, vol. 2. pp. 824-828. Sep. 15-18, 2002.

* cited by examiner

*Primary Examiner*—Matthew Anderson
*Assistant Examiner*—Minh Dao

(57) ABSTRACT

Communication signal equalization methods and systems are disclosed. A CDMA signal having a data portion and a known portion including a known or repeated data sequence and received over a multipath communication channel represents a linear convolution between the multipath channel and a transmitted CDMA signal. A channel estimate of the communication channel is determined from the known portion, and the CDMA signal is translated into a new CDMA signal which is a cyclic convolution with the channel estimate. A frequency domain representation of the new CDMA signal is adjusted using the channel estimate to produce a frequency domain representation of an equalized signal.

52 Claims, 6 Drawing Sheets

COMMUNICATION SIGNAL EQUALIZATION SYSTEMS AND METHODS

CROSS-REFERENCE TO RELATED APPLICATION

This application claims priority from U.S. Provisional Patent Application Ser. No. 60/493,331, filed on Aug. 8, 2003. The entire contents of this provisional application are hereby incorporated herein by reference.

FIELD OF THE INVENTION

The invention relates to communication signal equalization, and in particular, to systems and methods for frequency domain equalization in CDMA (Code Division Multiple Access) systems.

BACKGROUND OF THE INVENTION

The IS2000 standard (release-A or 1xRTT) supports up to 153.6 kbps peak user data rate, based on the CDG (CDMA Development Group) requirements for cdmaOne family evolution. One known so-called HDR (High Data Rate) system represents a major step forward to improve the packet data system throughput. A further improved version, HDR-1xEV-DO, has been adopted as an IS-856 standard, which aims to meet the CDG requirement for 1xRTT and evolution thereof. IS-856 is a data only system which will be overlaid on the 1xRTT network and uses a single carrier of 1.25 MHz co achieve a similar data rate (2 Mbps) to a 3-carriers configuration of CDMA2000. Although the chip rate is same as in IS-95/1xRTT, i.e. 1.2288 Mcps, 1xEV-DO introduces multiple enabling technologies. The basic 1xEV-DO employs a multi-code of Walsh sequence to construct a fat data pipe. However, such a multi-code channel with low spreading factor suffers from orthogonality loss in the dispersive channel due to inter-code interference, i.e., inter-symbol interference.

There are several key differences between IS-856 and traditional CDMA systems. For example, IS-856 is intended for non-real-time packet data. IS-856 is also a pure TDMA (Time Division Multiple Access) system, although signals are whitened by a scrambling code before transmission, occupies 1.25 MHz spectrum, and uses QPSK (Quadrature Phase Shift Keying), 8-PSK and 16-QAM (Quadrature Amplitude Modulation) modulation, only turbo codes, and full power transmission. Rate adaptation with a peak race of 2.48 Mbps, mobility support, proportional fairness scheduling, multi-user diversity, and connection with a PDSN (Packet Data Serving Node) and then IP (Internet Protocol), and therefore no connection with an MSC (Mobile Switching Center) or a circuit switched core network, represent further characteristics by which IS-856 differs from traditional CDMA systems.

The spectrum efficiency of IS-856 is achieved mainly by its TDMA signal structure along with scrambling codes, which makes it possible for frequency re-use one, fat-pipe scheduling to collect multi-user diversity by closely tracking the Rayleigh fading channel, high order modulation, and use of turbo codes.

Similar to CDMA2000, the downlink physical channel of 1xEV-DO occupies a 1.25 MHz spectrum with a chip rate 1.2288 Mcps. However, there is only one type of physical channel, which is divided into frames of 32768 chips or 26.67 ms. Each frame is further divided into 16 slots each has a length of 2048 chips or 1.67 ms. The slot is the basic unit and all other channels, such as the pilot channel, MAC (Media Access Control) channel, and traffic channels, will be multiplexed into a slot. In the downlink transmission direction, slots are classified into two modes, including active and idle. In active mode, an access network has either control information or user traffic information to send along with the pilot and MAC channels multiplexed into that slot. In idle mode, the access network transmits only the pilot and MAC channels. Each half slot has 96 pilot chips and 2*64 MAC chips. In summary, the pilot channel utilizes 9.375% of bandwidth and the MAC channel occupies 12.5% bandwidth.

One current 1xEV-DO terminal receiver chip solution is based on the rake receiver structure. The rake receiver works quite well in multi-path environments when the spreading factor is larger than 16. However, in order to increase the data throughput, 1xEV-DO employs a multi-code downlink with spreading factor 16. In this case, the rake receiver-based 1xEV/DO receiver has several limitations for implementation high level modulations. First, the baseband filter used at a transmitter is the same as in CDMA2000/IS-95, i.e. a 48-tap (chip) non-Nyquist filter, which always causes ICI (inter-chip interference). In addition, the maximum number of rake receiver fingers is 4, which sets a CIR (Carrier to Interference Ratio) ceiling of 17.8 dB. The relatively small bit width per sample further limits receiver performance.

All of these limitations may dramatically degrade the system performance when the multipath environment is rich, such as in a dense urban environment. The low sampling rate also causes finger detection inaccuracy. When the speed of a mobile communication device is high, tracking of channel variation may also be difficult. In practice, high level modulation such as 16-QAM cannot be used due to ICI caused by non-Nyquist filtering, and the 1xEV-DO high throughput is thereby generally limited to that achieved by Turbo coding and fast scheduling.

SUMMARY OF THE INVENTION

Embodiments of the present invention address issues associated with 1xEV-DO terminals and provide a simple frequency domain equalizer which achieves performance close to OFDM (Orthogonal Frequency Division Multiplexing) systems. Equalizers according to embodiments of the invention can mitigate performance loss for rake receiver-based 1xEV-DO terminals, allow the system to use even higher-level modulation such as 64-QAM, and reduce receiver complexity by replacing rake receiver structure with an FFT (Fast Fourier Transform) engine.

Downlink throughput may thus be enhanced by providing a frequency domain equalizer in a terminal receiver to alleviate ICI issues caused by both multi-path interference and non-Nyquist filtering, which prevents the use of high-level modulation.

According to one aspect, the invention provides a method of equalizing a CDMA signal received over a multipath communication channel, the CDMA signal having a data portion and a known portion which includes a known or repeated data sequence and representing a linear convolution between the multipath channel and a transmitted CDMA signal. The method involves determining from the known portion a channel estimate of the communication channel, translating the CDMA signal into a new CDMA signal which is a cyclic convolution with the channel estimate, and adjusting a frequency domain representation of the new CDMA signal using the channel estimate co produce a frequency domain representation of an equalized signal.

The operation of determining may include determining a time domain channel estimate from the known portion. In this case, adjusting may involve performing a time domain to frequency domain conversion on the time domain channel estimate to produce a frequency domain channel estimate and adjusting the frequency domain representation of the new CDMA signal using the frequency domain channel estimate.

In some embodiments, translating involves subtracting the known portion from the CDMA signal to produce the new CDMA signal, replacing at least some of the known portion with a new portion which converts the CDMA signal to the new CMDA signal.

A frequency domain to time domain conversion may be performed on the frequency domain representation of the equalized signal to produce a time domain equalized signal.

According to one embodiment, adjusting involves performing a component-wise division of the frequency domain representation of the new CDMA signal by the frequency domain channel estimate. The component-wise division may be performed for all values of the frequency domain channel estimate or only for values of the frequency domain channel estimate which are sufficiently large so as reduce effects of amplifying noise components of the CDMA signal. In the latter case, components of the frequency domain representation of the new CDMA signal for which the corresponding components of the frequency domain channel estimate are not sufficiently large may be replaced with a predetermined value or weighted.

A communication signal processing method is also provided, and includes multiplexing a data portion and a known portion which includes a known or repeated data sequence into a CDMA signal and outputting the CDMA signal for transmission to a receiver over a multipath communication channel and equalization at the receiver by determining from the known portion a channel estimate of the communication channel, translating the CDMA signal into a new CDMA signal which is a cyclic convolution with the channel estimate, and adjusting a frequency domain representation of the new CDMA signal using the channel estimate to produce a frequency domain representation of an equalized signal.

In a further aspect of the invention, there is provided a system for equalizing a portion of a CDMA signal received over a multipath communication channel, the CDMA signal having a data portion and a known portion which includes a known or repeated data sequence and representing a linear convolution between the multipath channel and a transmitted CDMA signal. The system includes an input and a processor which is configured to receive the CDMA signal from the input, to determine from the known portion a channel estimate of the communication channel, to translate the CDMA signal into a new CDMA signal which is a cyclic convolution with the channel estimate, and to adjust a frequency domain representation of the new CDMA signal using the channel estimate to produce a frequency domain representation of an equalized signal. The processor may be further configured to perform these functions in a particular manner or to perform additional functions.

A communication signal processing system at a transmitter is also provided, and includes an input for receiving data to be transmitted, and a processor configured to receive the data from the input, to multiplex the data and a known or repeated data sequence into a CDMA signal to form a data portion and a known portion, and to output the CDMA signal for transmission to a receiver over a multipath communication channel and equalization at the receiver by determining from the known portion a channel estimate of the communication channel, translating the CDMA signal into a new CDMA signal which is a cyclic convolution with the channel estimate, and adjusting a frequency domain representation of the new CDMA signal using the channel estimate to produce a frequency domain representation of an equalized signal.

Yet another aspect of the invention provides a CDMA communication system including communication equipment having a processor configured to receive from an input data to be transmitted, to multiplex the data and a known or repeated data sequence into a CDMA signal co form a data portion and a known portion, and to output the CDMA signal for transmission, and communication equipment having a processor configured to receive the CDMA signal over a multipath communication channel, to determine from the known portion a channel estimate of the communication channel, to translate the CDMA signal into a new CDMA signal which is a cyclic convolution with the channel estimate, and to adjust a frequency domain representation of the new CDMA signal using the channel estimate to produce a frequency domain representation of an equalized signal. These types of communication equipment may be implemented at a network element of the communication system, a communication terminal adapted for operation in the communication system, or both.

Other aspects and features of embodiments of the present invention will become apparent to those ordinarily skilled in the art upon review of the following description of specific illustrative embodiments of the invention.

BRIEF DESCRIPTION OF THE DRAWINGS

Examples of embodiments of the invention will now be described in greater detail with reference to the accompanying drawings, in which.

DETAILED DESCRIPTION OF PREFERRED EMBODIMENTS

Figure 1A:
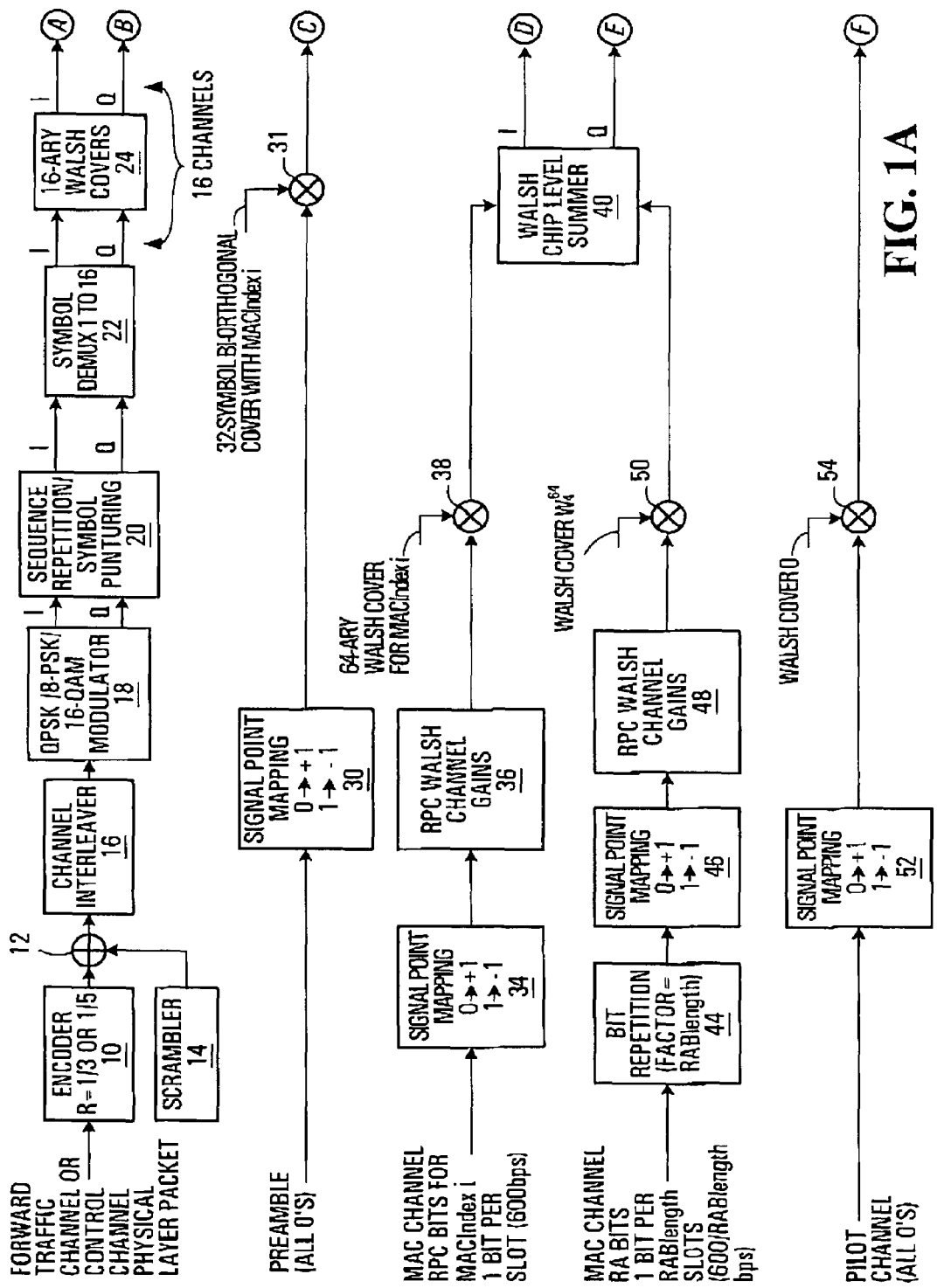
FIGS. 1A and 1B show a block diagram of a transmit chain for a 1xEV-DO forward communication link.
Figure 1B:
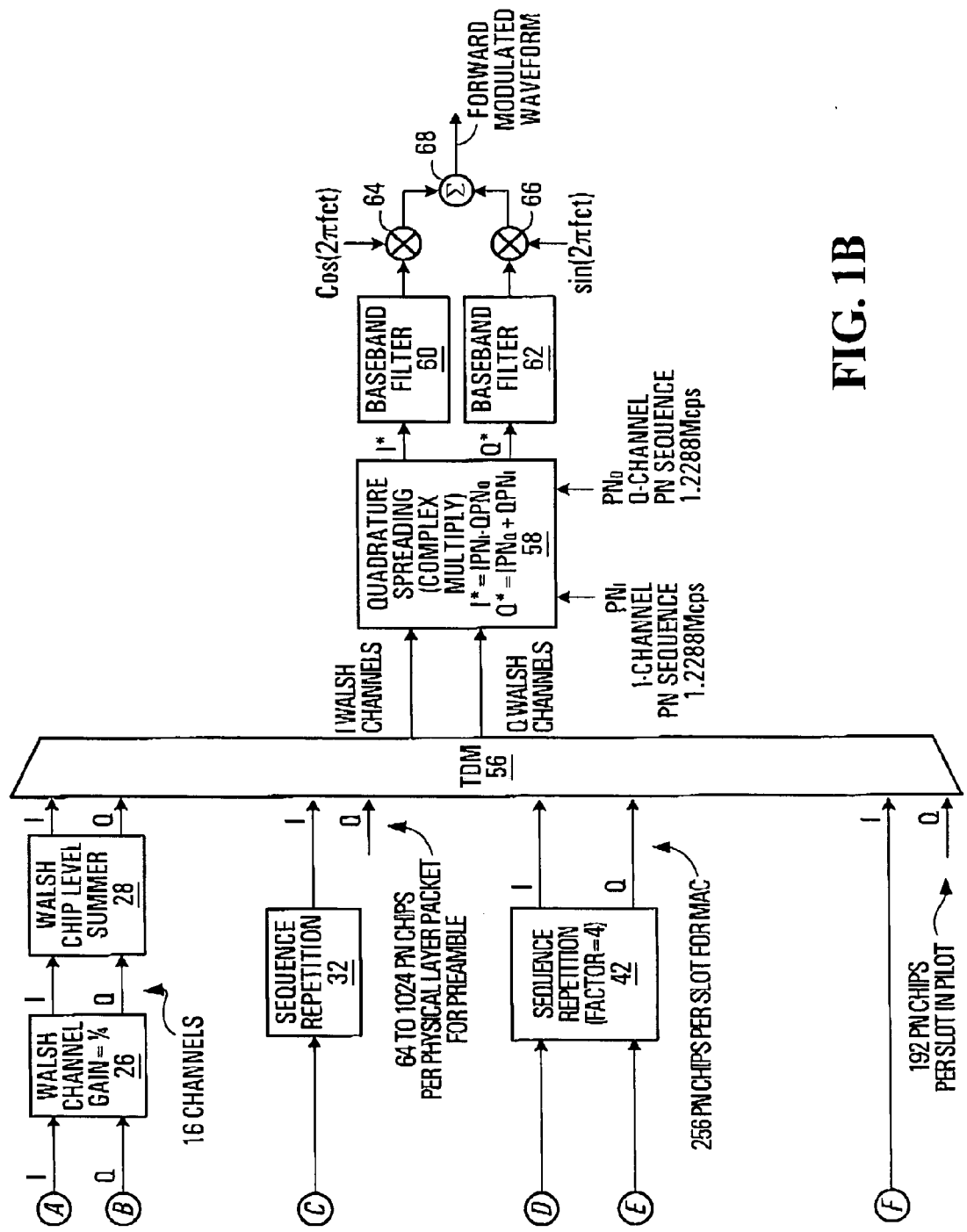

FIGS. 1A and 1B show a block diagram of a transmit chain for a 1xEV-DO forward communication link. Those skilled in the art will appreciate that the elements shown in FIGS. 1A and 1B represent an illustrative example of a transmit chain, and that the invention is in no way limited to implementation in conjunction with a transmitter having the structure explicitly shown in FIGS. 1A and 1B. Thus, the contents of FIGS. 1A and 1B, as well as the other Figures described herein, are intended solely for illustrative purposes and do not limit the scope of the invention.

The transmit chain of FIGS. 1A and 1B, which would be implemented at a base station or other network element in a communication network for a forward link, includes signal paths for traffic or control channels, a MAC channel, and a pilot channel.

The traffic or control channel signal path includes an encoder 10, illustratively a coding rate R=⅓ or R=⅕ Turbo encoder, connected to a combiner 12 which is also connected to a scrambler 14 and a channel interleaver 16. The channel interleaver 18 is connected to a sequence repetition and symbol puncturing element 20, and the traffic/control channel transmit signal path continues with a symbol demultiplexer 22, a Walsh coding element 24, a Walsh channel gain element 26, and a Walsh chip level summer 28.

The MAC channel path in FIGS. 1A and 1B includes a preamble path which includes a signal point mapping element 30, a multiplier 31, and a sequence repetition element 32, a MAC RPC (Reverse Power Control) path which includes a signal point mapping element 34, an RPC Walsh channel gain element 36, and a multiplier 38, and a MAC RA (Reverse Activity) path which includes a bit repetition element 44 with a repetition factor of a number of RA bits (RABLength), a signal point mapping element 46, an RA channel gain element 48, and a multiplier 50. The RPC and RA bits output by the multipliers 38 and 50 are combined in the Walsh chip level summer 40, which is connected to a sequence repetition element 42 having a repetition factor of 1.

In the pilot channel signal path, a signal point mapping element 52 is connected to a multiplier 54.

Figure 2:
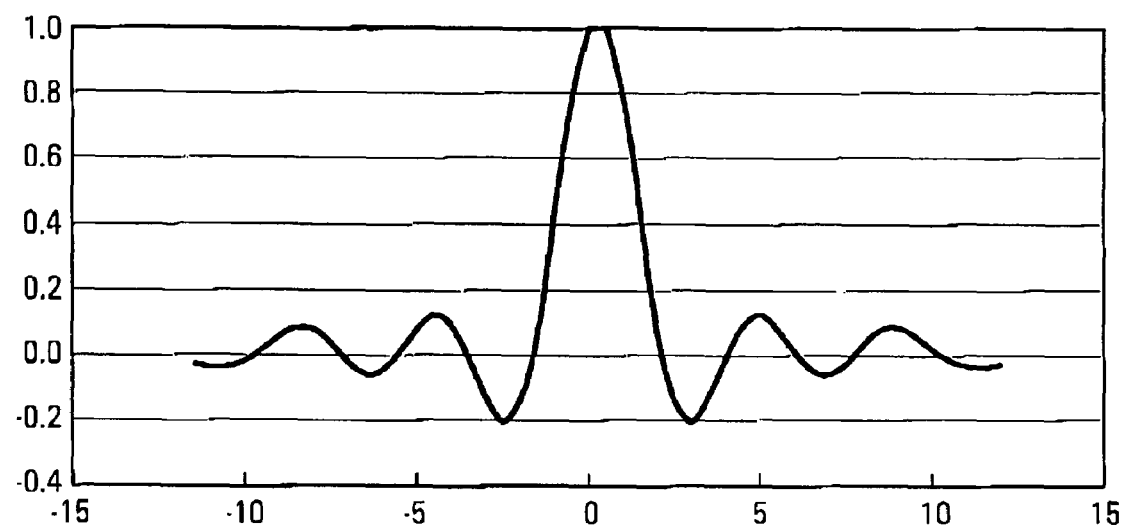
FIG. 2 is a plot of a filter response of a baseband filter of the transmit chain of FIG. 1.

All of the above signal paths are connected to the time division multiplexer (TDM) 56, which outputs a multiplexed signal to the spreading element 58. Baseband filters 60 and 62 are connected to the spreading element 58 and output filtered signals to the multipliers 64, 66. The baseband filters 60 and 62 of FIG. 1 are typically non-Nyquist filters, and may have a response as shown in FIG. 2, for example. The combiner 68 combines modulated signals output from the multipliers 64, 66 and outputs a modulated waveform, to an antenna or other transmitter components for transmission, for example.

Figure 3:
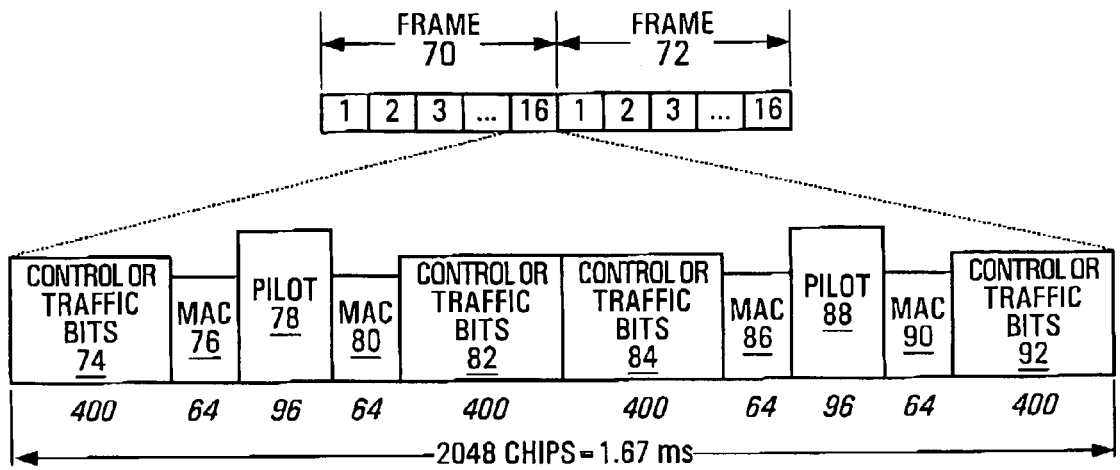
FIG. 3 is a block diagram illustrating a 1xEV-DO frame and slot structure.

The transmit chain of FIGS. 1A and 1B operates to generate a signal having a structure as shown in FIG. 3, which is a block diagram illustrating a 1xEV-DO frame and slot structure. Operation of the transmit chain of FIGS. 1A and 1B will be apparent to those skilled in the art and therefore is not described in detail herein.

As described briefly above, the downlink physical channel of 1xEV-DO occupies a 1.25 MHz spectrum with a chip rate 1.2288 Mcps, and the physical channel is divided into frames 70, 72 of 32768 chips or 26.67 ms. Each frame 70, 72 is further divided into 16 slots of 2048 chips or 1.67 ms in length. The traffic, control, pilot, and MAC channels are multiplexed into a slot. The slot shown in FIG. 2 includes 400 chips of control or traffic data at 74, followed by 64 MAC chips 76, 96 pilot chips 78, another block of 64 MAC chips 80, and another block of 400 control or traffic chips 82. This pattern is repeated at 84, 86, 88, 90, 92. Thus, each half slot has 96 pilot chips, 2*64 MAC chips, and 800 control or traffic chips.

Embodiments of the invention address various performance issues associated with 1xEV-DO terminal implementations using frequency domain equalization. In some embodiments, a multipath channel is conversed into a single path in the frequency domain, similar to OFDM. However, it is well known that OFDM systems translate a signal into a periodic signal by using the so-called Identical Cyclic Prefix so that the advantages of a cyclic convolution are realized. In CDMA technology, the OFDM assumption of a cyclic prefix never holds, as a CDMA signal is always scrambled by a PN sequence. The proposed frequency domain equalizer does not require such an assumption.

Downlink throughput is enhanced by providing a frequency domain equalizer to mitigate the multi-path distortion problem and the non-Nyquist filter problem which cause ICI and prevent the use of high-level modulation.

A frequency domain equalizer according to one embodiment exploits the downlink slot structure to remove the multipath in the frequency domain, and equalized frequency domain data is converted to the time domain, using an IFFT (Inverse Fast Fourier Transform), for example. Although detailed examples provided herein are applicable to 1xEV-DO, the standard for which is hereby incorporated by reference in its entirety, it is to be understood that applications of the invention are not limited to the context of this standard.

Figure 4:
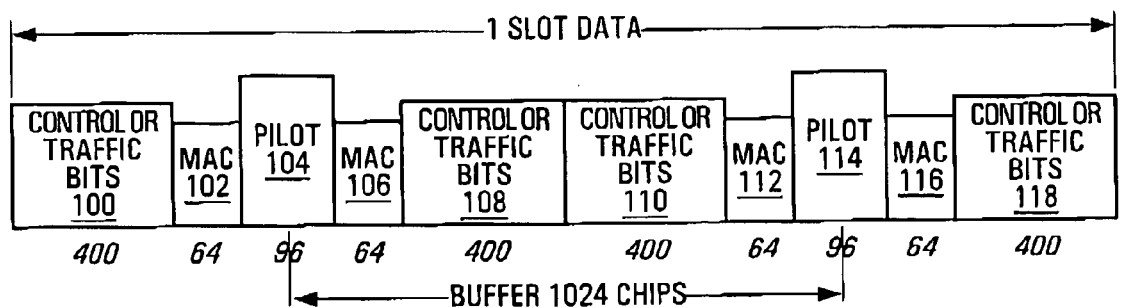
FIG. 4 is a block diagram of the slot structure of FIG. 3 illustrating data which is buffered in accordance with an embodiment of the invention, as an implementation example.

FIG. 4 is a block diagram of the slot structure of FIG. 3 illustrating data which is buffered in accordance with one embodiment of the invention. As chose skilled in the art will appreciate, a receiving terminal performs operations such as acquiring the system, including frame timing and slot timing, in order to properly detect the slot structure of FIG. 4. Therefore, a receiving terminal may perform these operations prior to or substantially concurrently with the equalization operations described in detail herein. Further operations may also be performed prior to, concurrently with, or after equalization without departing from the scope of the invention.

In the illustrated embodiment, a slot includes 400 chips of control or traffic data 100, a block of 64 MAC chips 102, 96 pilot chips 104, another block of 64 MAC chips 106, another block of 400 chips of control or traffic data 108, and a similar pattern of 400 control or traffic chips 110, 64 MAC chips 112, 96 pilot chips 114, 64 MAC chips 116, and 400 control or traffic chips 118, of which 1024 chips are buffered, in a FIFO (First In First Out) register in a memory device, for example, for processing. The buffered data includes a control or traffic data portion 108, 110 between two adjacent pilot portions 104, 114. The buffer size and timers are thus preferably selected accordingly to fit channel coding blocks. The buffered data contains 48 pilot chip samples at the front, 48 pilot chip samples in the end, and 2 MAC portions 106, 112 enclosing 2 traffic data portions 108, 110.

Although embodiments of the invention are described below primarily in the context of a buffered data block as shown in FIG. 4, it should be appreciated that other buffering schemes may be used, to equalize the control or traffic blocks 100, 108, for example, in a substantially similar manner using the pilot chips 104 and the MAC chips 102, 106.

For simplicity, the buffered complex data samples are denoted $r(0), r(1), \ldots, r(1023)$. Of course, other numbers of samples may be used, although powers of 2 may be preferred. Estimated time domain channel impulse response are similarly denoted $ch(0), ch(1), \ldots, ch(N)$, where N is selected to cover the targeted the delay spread of the environment and the non-Nyquist ICI effects, and is 14 in one embodiment.

The pilot portions, which contain a known data sequence or pattern, may first be extracted from both ends of the buffered data. This might be accomplished, for example, using a short scrambling code determined according to the index of a starting point of the data block. Assuming that corresponding pilot scrambling code segments are respectively spn(0), spn(1), . . . ,spn(47) and spn(975), spn(976), . . . ,spn(1023), a prefix z(n) may be generated as follows:

For $n=0:N-1$ $$z(n) = \sum_{k=0}^{n} spn(k)ch(n-k) + \sum_{k=1024-N+n}^{1023} spn(k)ch(1024+n-k)$$

end

Replacing the first N received samples by z(0), . . . , z(N−1), the new buffered data is z(0),z(1), . . . ,z(N−1), r(N), . . . ,r(1023) This represents one mechanism for translating a received CDMA signal, which is a linear convolution between a transmitted CDMA signal and a multipath communication channel, into a new CDMA signal which is a cyclic convolution with a channel estimate.

More generally, in some embodiments, the effects of interference from a preceding transmission, typically MAC or pilot, are removed from the buffered data by reconstructing the interference and subtracting it. Such known or repeated data sequences in a known portion of a signal may also be removed from a received signal in other embodiments.

The re-constructed channel taps ch(0),ch(1), . . . ,ch(N) are preferably converted from the time domain to the frequency domain. In one embodiment, a DFT (Discrete Fourier Transform) of the same size as the buffered data block size, 1024 in this example, is used for time to frequency domain conversion, although other types of transform or conversion are also contemplated. Frequency domain components of the channel taps are denoted cf(0), cf(1), . . . ,cf(N−1),cf(N), . . . ,cf(1023) for the following description.

The received and buffered data block is also preferably converted into the frequency domain, using a DFT or another transform or conversion to yield rf(0),rf(1), . . . , rf(N−1),rf(N), . . . ,rf(1023). In some embodiments, the received data block or portions thereof may include frequency domain components which may be used directly in frequency domain equalization. For example, the symbol demultiplexer 22 in the transmit chain of FIG. 1 converts frequency domain symbols into the time domain. However, if frequency domain components are transmitted to a receiver, then at least a portion of the time to frequency domain conversion may be avoided at the receiver, to thereby effectively split equalization processing between a transmitter and a receiver. In this sense, a transmitter may assist with processing operations to be performed at a receiver.

Multipath effects may then be reduced in the frequency domain by performing a component-wise complex division, or a maximum likelihood detection, etc. Here we use a simple complex division, for example to produce a frequency domain representation of an equalized signal re(k)= rf(k)/cf(k).

The resultant equalized data block may then be converted back into a time domain signal by performing an IDFT (Inverse DFT) or other conversion on the data block re(0), re(1), . . . ,re(1023). The converted time domain output includes an equalized data stream, which may be further processed, to be de-scrambled and then decoded for instance.

Figure 5:
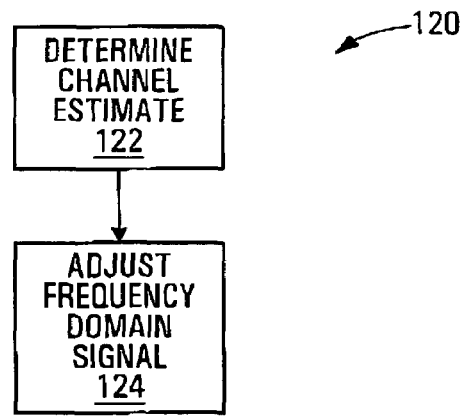
FIG. 5 is a flow diagram of a method according to an embodiment of the invention.

Thus, more generally, a method according to an embodiment of the invention may include the operations shown in the flow diagram of FIG. 5. The method of FIG. 5 relates to equalizing a portion of a CDMA signal received over a multipath communication channel. The CDMA signal has a data portion and a known portion which includes a known data sequence.

The method 120 includes determining at 122, from the known portion, a channel estimate of the communication channel. At 124, a frequency domain representation of the CDMA signal is adjusted using the channel estimate to produce a frequency domain equalized signal. Adjusting at 124 may include performing a component-wise division of the frequency domain representation of the CDMA signal by the frequency domain channel estimate, for example, to produce the frequency domain equalized signal.

The channel estimate may initially be determined at 122 as a time domain channel estimate and then converted to a frequency domain channel estimate, using a DFT, for example, for use in adjusting the frequency domain signal at 124.

The method also preferably includes an operation co translate a received CDMA signal, which represents a linear convolution between a transmitted signal and a multipath channel, into a new CDMA signal which is a cyclic convolution with the channel estimate. Replacement or removal of the known portion of a received signal or its interference effects, as described above, are examples of techniques which may be used to accomplish such a translation. This translation function may also involve time/frequency domain conversions, depending upon the domain in which the translation is to be performed. The resultant new CDMA signal is then preferably adjusted at 124.

In one embodiment, a method also includes operations of reconstructing an interference effect of the known portion upon the data portion using the time domain channel estimate and subtracting the interference effect from the data portion to produce an interference compensated portion of the CDMA signal. The interference compensated portion of the CDMA signal is then converted to the frequency domain to produce the frequency domain representation of the CDMA signal.

According to another embodiment of the invention, the method includes replacing at least some of the known portion of the CDMA signal with a new portion to convert the CDMA signal to the new CMDA signal which is a cyclic convolution with the time domain channel estimate. The frequency domain representation of the CDMA signal is produced by performing a time domain to frequency domain conversion on the new CDMA signal.

Effects of the communication channel as represented by the frequency domain channel estimate are removed from the frequency domain representation of the CDMA signal in a further embodiment of the invention.

ISI effects may also or instead be removed from the CDMA signal using the time domain channel estimate to produce an interference compensated CDMA signal, which may be converted to the frequency domain to produce the frequency domain representation of the CDMA signal.

Considering channel estimation in further detail in the context or the above example slot structure, there are two blocks of pilot data during each slot that can be used to estimate the time domain channel impulse response. For the purposes of illustration, it is assumed that transmitted chip data {s(k)} will go through a multi-path channel defined by $$ch(t) = \sum_{l=1}^{N_r} \alpha(l)h(t - \tau(l)),$$

with random delays and Rayleigh fading on each path. The channel impulse response ch(t) will be relatively stable within a full slot or half a slot. In this multi-path channel, there are $N_r$ significant paths. $\tau(l)$ is the delay of $l^{th}$ path and $\alpha(l)$ is the corresponding channel gain which belongs to a Rayleigh distribution. Note that all the delays will refer to the same clock, (e.g. the frame/slot boundary captured after system acquisition).

On a receiving terminal side, the received baseband signal can be modeled as:

$$r(t) = \sum_{n} s(n)ch(t - nT) + n(t),$$

with n(r) representing noise.

Suppose the sampling rate is $Mf_c$, which represents M samples per chip. A synchronization module or finger detection module at the receiving terminal will find the strongest path, illustratively path number two although any path might be strongest, with a timing/finger reference of $\tau'(2)$, which can be directly related to an $Mf_c$ index. Note that $\Delta = \tau'(2) - \tau(2)$ might not be zero due to the sampling resolution, but a smaller $\Delta$ may be generally preferred. Decimation to $1f_c$ sampling yields $$r(k) = r(kT + \tau'(2))$$
$$= \sum_{n} s(n)ch(kT + \tau'(2) - nT) + n(kT)$$
$$= \alpha(2)\sum_{n} s(n)h(kT + \Delta - nT) +$$
$$\sum_{n} s(n)\sum_{l \neq 2}^{N_r} \alpha(l)h(kT + \tau'(2) - \tau(l) - nT)$$
$$= \alpha(2)\sum_{n} s(n)h((k-n)T + \Delta) +$$
$$\sum_{n} s(n)\sum_{l \neq 2}^{N_r} \alpha(l)h((k-n)T + \tau(2) - \tau(l) + \Delta).$$

Note that the clock now is only locking to the open-eye point $\tau'(2)$. If this open eye is exact, then $\Delta$ will disappear. Otherwise, $\Delta$ will affect all other paths. In implementation, reference can still be made to the frame/slot boundaries by converting the relative timings.

For the purpose of channel reconstruction, the observed data $\{r(k)\}$ may be used to reconstruct the overall channel as $$ch(m) = ch(mT + \tau'(2))$$
$$= \alpha(2)h(mT + \Delta) + \sum_{l \neq 2}^{N_r} \alpha(l)h(mT + \tau'(2) - \tau(l)).$$

Assuming that the number of channel taps is N+1 and ch(m)=0 when m<0 and m>N, then the above equation can be simply re-expressed as $$r(k) = \sum_{n} s(n)ch(k - n) + n(kT)$$
$$= \sum_{n=k-N}^{n=k} s(n)ch(k - n) + n(kT).$$

This equation is the basis for the LMS (Least Mean Square) channel estimation. As described above, $\{r(k)\}$ is the received data sequence and known sequences are periodically transmitted and therefore received in the receiving terminal.

Now we suppose that a portion of known chip sequences are transmitted starting from index $K_1$ and end at the last known chip $K_2$. From the preceding equation, it can be seen that the received data sequence $r(K_1+N), \ldots, r(K_2)$ is the only portion which is fully attributable to the known sequence $s(K_1), \ldots s(K_2)$. The transmitter timing can therefore also be derived from received data timing, resulting in the following shortened linear equations based on the preceding equation with this portion of the known sequence:

$$r(k) = \sum_{n} s(n)ch(k - n) + n(kT)$$
$$\sum_{n=k-N}^{n=k} s(n)ch(k - n) + n(kT) \quad k = K_1 + N, \ldots, K_2.$$

In matrix form, $$\begin{bmatrix} s(K_1) & s(K_1+1) & \ldots & s(K_1+N) \\ s(K_1+1) & s(K_1+2) & \ldots & s(K_1+N+1) \\ \ldots & \ldots & \ldots & \ldots \\ s(K_2-N) & s(K_2-N+1) & \ldots & s(K_2) \end{bmatrix} \begin{bmatrix} ch(N) \\ ch(N-1) \\ \vdots \\ ch(0) \end{bmatrix} +$$

$$\begin{bmatrix} n(K_1) \\ n(K_1+1) \\ \vdots \\ n(K_2-N) \end{bmatrix} = \begin{bmatrix} r(K_1+N) \\ r(K_1+N+1) \\ \vdots \\ r(K_2) \end{bmatrix}.$$

Figure 6:
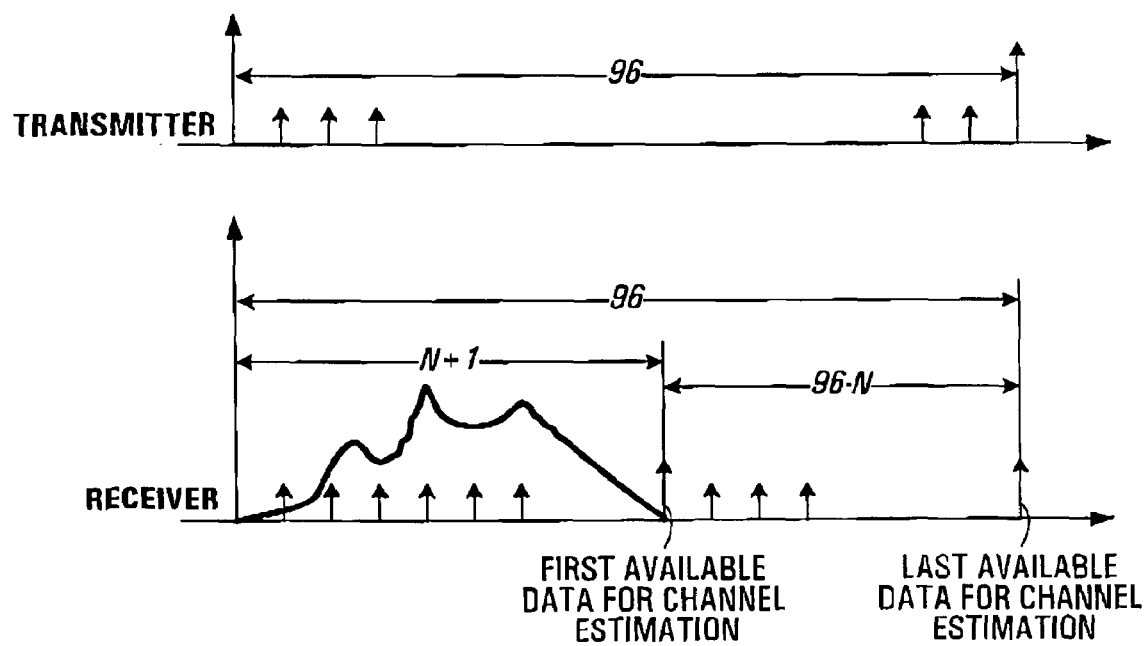
FIG. 6, as an example, is a representation of received data for use in channel estimation according to an embodiment of the invention.

Such a set of a linear equations has N+1 unknowns and K2−K1−N equations. Particularly, with the 96 continuous known pilot chips, in two pilot blocks in the above example, we have 96−N equations, as illustrated in FIG. 6. The curve in FIG. 6 illustrates receiver timing versus transmitter timing, and the capture of an entire multipath impulse response using relative timing. Two portions of known data may be staggered, which can result in double equations and so on, or channel estimation may be performed substantially separately based on each known portion, with an average of the estimated channels being used as a final channel estimate.

In any case, generic linear equations such as those above are to be resolved during channel estimation. Because of noise, these equations are preferably resolved by LMS methods. An explicit solution may be expressed as $$\begin{bmatrix} ch(N) \\ ch(N-1) \\ \vdots \\ ch(0) \end{bmatrix} = (S^T S)^{-1} S^T \begin{bmatrix} r(K_1+N) \\ r(K_1+N+1) \\ \vdots \\ r(K_2) \end{bmatrix}, \text{ where}$$

$$S = \begin{bmatrix} s(K_1) & s(K_1+1) & \ldots & s(K_1+N) \\ s(K_1+1) & s(K_1+2) & \ldots & s(K_1+N+1) \\ \ldots & \ldots & \ldots & \ldots \\ s(K_2-N) & s(K_2-N+1) & \ldots & s(K_2) \end{bmatrix}.$$

A more efficient way to derive the solution is to solve the following linear equations directly:

$$S^T S \begin{bmatrix} ch(N) \\ ch(N-1) \\ \vdots \\ ch(0) \end{bmatrix} = S^T \begin{bmatrix} y(K_1+N) \\ y(K_1+N+1) \\ \vdots \\ y(K_2) \end{bmatrix}.$$

It is worthy to note that the coefficient matrix of this linear equation is an integer Hermitian matrix of dimension $(N+1)\times(N+1)$. Either Cholesky or SVD (Singular Value Decomposition) methods can be used to solve these linear equations. The particular decomposition method to be used is a design option. On the other hand, the matrix S is only related to the scrambling code in some embodiments and therefore can be formulated just after a communication link is set up. The decomposition is also preferably performed only once per link and used until the link is terminated.

A time domain channel estimate may be used to perform time domain equalization, although the complexity of time domain equalization is expected to be approximately 8 times that of frequency domain equalization.

In an embodiment of the invention described above, equalization involves complex division, in which small values of cf(k) may enhance noise. Although the above division simplifies the implementation, it might not be optimal in a noisy and fading environment. For example, the multipath channel may have either a null or a notch in the frequency domain. Unlike OFDM, this noise enhancement affects a subsequent IFFT result and it may therefore represent a global effect. In order to mitigate this drawback, further techniques as described below may be used, albeit with more implementation complexity.

Suppose β is a predefined threshold which reflects the system tolerance for noise enhancement. Frequency tones can then be classified into two sets, i.e. a "good" or favorable set Ω and a "bad" or unfavorable set Ψ, which are defined as $$\Omega = \{k | |cf(k)| > \beta\}, \Psi = \{k | |cf(k)| \le \beta\}.$$

It will be apparent that good tones $k\in\Omega$ will not enhance the noise or will enhance by a tolerable amount such that an equalizer may use the complex division scheme described above, whereas bad tones $k\in\Psi$ will enhance the noise too much and therefore the division is not feasible.

In one embodiment, each rf(k) for $k\in\Psi$ is multiplied by β. According to another embodiment, weights are determined and applied to the components rf(k) for $k\in\Psi$.

An example weight calculation technique defines $$d(m) = spn(m) - \sum_{k\in\Omega} \frac{rf(k)}{cf(k)} \exp\left(jmk\frac{2\pi}{1024}\right), m=0, 1, \ldots, 47.$$

It is noted that spn(0),spn(1), . . . ,spn(47) are the known pilot chips in front of a buffered data block. Solutions to the following quadratic optimization provide optimal weights ω.

$$\min \sum_{m=0}^{47} \left\| \sum_{k\in\Psi} \omega(k) rf(k) \exp\left(jmk\frac{2\pi}{1024}\right) - d(m) \right\|^2.$$

If the number of bad tones is less than some number, for example 48 (the last 48 known chips can be used to handle up to 96 bad tones), the above optimization has a unique solution with explicit formula $$\omega = (E_\Psi^* E_\Psi)^{-1} E_\Psi^* d,$$

where $E_\Psi$ is a matrix formed by both rf(k) and $$\exp\left(jmk\frac{2\pi}{1024}\right)$$

for $k\in\Psi$ and m=0,1, . . . ,47. Note that the matrix $E_\Psi$ has a very special structure and therefore can be inverted very efficiently. After this optimization calculation, the equalized frequency domain data block becomes re(k)=rf(k)/cf(k), $k\in\Omega$ and re(k)=ω(k)rf(k), $k\in\Psi$.

The preceding weight calculation equations assume a buffered block length of 1024 chips and 48 pilot chips. However, it should be appreciated that the invention is in no way limited to these particular lengths. In general, weights may be calculated in a substantially similar manner for any known data pattern length a and block length b.

Figure 7:
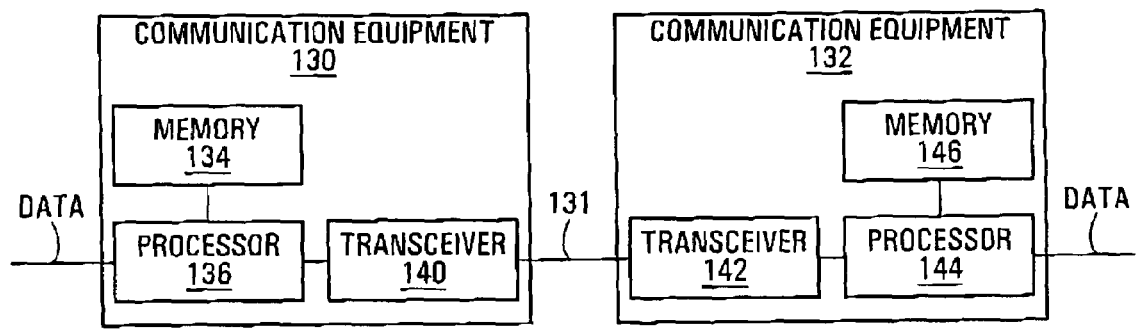
FIG. 7 is a block diagram of a system in which embodiments of the invention may be implemented.

FIG. 7 is a block diagram of a system in which embodiments of the invention may be implemented. The system includes communication equipment 130, 132 connected by a communication link 131. It will be apparent to those skilled in the art, however, that a communication system may include many more than two installations of communication equipment between which communications may be established.

Although shown in FIG. 7 as a connection, the link 131 need not necessarily be a physical connection. For example, in one embodiment, the communication equipment 130 and 132 are a network element and a communication terminal, respectively, in a wireless communication system. The link 131 also need not be a direct connection, and may include connections through one or more networks or intervening components, for example.

Communication equipment 130 includes a processor 136 connected to a memory 134, and a transceiver 140. Communication equipment 132 has a similar structure, including a processor 144 connected to memory 146, and a transceiver 142. It should be appreciated that other components than those explicitly shown in FIG. 7 may be provided, depending upon the particular type of the communication equipment 130, 132. It should also be noted that although the communication equipment 130, 132 have the same general structure in FIG. 7, embodiments of the invention may be implemented in conjunction with substantially different communication equipment. In the above example of a network element and a communication terminal, both the network element and the communication terminal may include a processor, a memory, and a transceiver, as shown, but are otherwise very different equipment.

The processor 136 may be a microprocessor which executes software stored in the memory 134. The processor 136 may instead be implemented as a microcontroller, a DSP (digital signal processor), an ASIC (Application Specific Integrated Circuit), or other processing element. Embodiments of the invention may be implemented using a dedicated processor or a processor which also performs other functions. For example, the processor 136 may execute operating system software and software applications to support functions other than those disclosed herein.

The memory 134 represents a memory device, and may include, for example, any of solid state memory devices, disk drives, and other memory devices adapted to operate with fixed or removable memory media.

The transceiver 140 enables communication with the communication equipment 132 via the communication link 131. Many different types of transceiver 140 will be apparent to those skilled in the art, for use in conjunction with corresponding types of communication link. Embodiments in which the transceiver 140 includes components to enable communications over multiple types of communication link are also contemplated. It should be appreciated that the invention is in no way limited to implementation in conjunction with communication equipment which is capable of two-way communications. Thus, the equalization techniques disclosed herein may be implemented at communication equipment which includes a receiver instead of the transceiver 140. Similarly, transmit-side functions may be performed at communication equipment which includes only a transmitter.

The processor 144, transceiver 142, and memory 146 in communication equipment 132 may be substantially similar to the processor 136, memory 134, and transceiver 140 in communication equipment 130, described above.

In operation, transmitting communication equipment, illustratively communication equipment 130, generates a CDMA signal for transmission to receiving communication equipment, illustratively communication equipment 132. As the communication equipment 130, 132 include transceivers 140, 142 which may send or receive signals, these example designations of transmitter and receiver are intended solely for illustrative purposes. In the system of FIG. 7, communication signals may be sent in either direction on the link 131.

According to the above example in which communication equipment 130 is to transmit a signal to communication equipment 132, the processor 136 is configured, by executing software in the memory 134 for instance, to receive from an input data to be transmitted, and to multiplex the data and a known or repeated data sequence into a CDMA signal. The CDMA signal is then output for transmission. Transmission of the signal may be substantially in real time when the signal is output or at a later time, in which case the signal may be stored in the memory 134, for example. The multiplexed data may include time domain components and/or frequency domain components. As described above, where frequency domain components are multiplexed into the CDMA signal, the amount of processing associated with performing time domain to frequency domain conversion at a receiver prior to frequency domain equalization is reduced.

In one embodiment, the processor 136 implements a conversion engine, illustratively an IDFT or IFFT engine, for converting frequency domain components generated during encoding of the data into time domain components.

At receiving communication equipment 132, the processor 144 is configured to receive the CDMA signal from an input, which may be connected to the transceiver 142, to determine from the known data sequence a frequency domain channel estimate, and to adjust a frequency domain representation of the CDMA signal using the frequency domain channel estimate to produce a frequency domain representation of an equalized signal. Configuration of the processor 144, as for the processor 136 described above, may be accomplished by providing software in the memory 146 for execution by the processor 144, for example.

The processor 144 may convert received time domain components of the CDMA signal or a determined time domain channel estimate into corresponding frequency domain components. This conversion function may be supported, for example, by a conversion engine such as a DFT or an FFT engine implemented in software in the memory 146. Conversion of an equalized frequency domain signal to the time domain may similarly be provided by an IDFT or IFFT engine, for example.

The memory 146 may also be used to store the CDMA signal or portions thereof. With reference to FIG. 4, 1024 chips of a received CDMA signal are stored in the memory 146 in one embodiment of the invention.

Other functions may also be performed by the processors 136 and 144, including additional equalization functions as described above and/or further signal processing functions, such as de-scrambling and normal CDMA signal decoding to recover and output transmitted data. Separate processors or functional elements may instead be provided for equalization, de-scrambling, decoding, and other operations. Therefore, although only a single processor has been shown in communication equipment 130, 132 in FIG. 7, embodiments of the invention may be implemented with one or more elements embodying equalization, de-scrambling, decoding, and other receiving operations, and corresponding operations at transmitting communication equipment.

In a preferred embodiment of the invention, frequency domain equalization is implemented for forward links in a wireless communication network, such that transmitting operations are supported at network elements such as base stations and receiving operations are supported at communication terminals. However, frequency domain equalization may also or instead be implemented on reverse links.

Embodiments of the invention can be added to existing communication equipment, for example, by including extra transform functionality, such as DFT/IDFT or FFT/IFFT for conversion from the time domain to the frequency domain for equalization and conversion of an equalized signal from the frequency domain to the time domain. This might be integrated onto an existing chip, or provided in a separate chip. It can be implemented in hardware, software, or some combination thereof.

What has been described is merely illustrative of the application of the principles of the invention. Other arrangements and methods can be implemented by those skilled in the art without departing from the scope of the present invention.

For example, although described primarily in the context of methods and systems, other implementations of the invention are also contemplated, such as in instructions stored on a computer-readable medium.

We claim:

1. A method of equalizing a CDMA signal received over a multipath communication channel, the CDMA signal having a data portion and a known portion comprising a known or repeated data sequence and representing a linear convolution between the multipath channel and a transmitted CDMA signal, the method comprising:
   determining from the known portion a channel estimate of the communication channel;
   translating the CDMA signal into a new CDMA signal which comprises a cyclic convolution with the channel estimate; and
   adjusting a frequency domain representation of the new CDMA signal using the channel estimate to produce a frequency domain representation of an equalized signal.

2. The method of claim 1, wherein determining comprises determining a time domain channel estimate from the known portion, and wherein adjusting comprises performing a time domain to frequency domain conversion on the time domain channel estimate to produce a frequency domain channel estimate and adjusting the frequency domain representation of the new CDMA signal using the frequency domain channel estimate.

3. The method of claim 2, wherein translating comprises subtracting the known portion from the CDMA signal to produce the new CDMA signal.

4. The method of claim 2, wherein translating comprises replacing at least some of the known portion with a new portion which converts the CDMA signal to the new CMDA signal which is a cyclic convolution with the time domain channel estimate.

5. The method of claim 2, wherein adjusting comprises:
   removing the effect of the channel as represented by the frequency domain channel estimate from the frequency domain representation of the new CDMA signal.

6. The method of claim 2, wherein translating comprises removing ISI (inter-symbol interference) effects from the CDMA signal using the time domain channel estimate to produce the new CDMA signal.

7. The method of claim 4, further comprising:
   generating the new portion of the CDMA signal as $$z(n) = \sum_{k=0}^{n} spn(k)ch(n-k) + \sum_{k=1024-N-n}^{1023} spn(k)ch(1024+n-k) \text{ for } n = 0:N-1,$$

where
   N is selected to cover a targeted delay spread and the interference effects;
   spn(k)={spn(0),spn(1), . . . ,spn(47)} and {spn(975),spn(976), . . . ,spn(1023)} comprises pilot scrambling code segments for pilot signalling comprising the known portion; and
   ch(k)=ch(0),ch(1), . . . ,ch(N) comprises the time domain channel estimate.

8. The method of claim 2, wherein determining the time domain channel estimate comprises solving:

$$\begin{bmatrix} s(K_1) & s(K_1+1) & \cdots & s(K_1+N) \\ s(K_1+1) & s(K_1+2) & \cdots & s(K_1+N+1) \\ \cdots & \cdots & \cdots & \cdots \\ s(K_1-N) & s(K_1-N+1) & \cdots & s(K_2) \end{bmatrix} \begin{bmatrix} ch(N) \\ ch(N-1) \\ \vdots \\ ch(0) \end{bmatrix} +$$

$$\begin{bmatrix} n(K_1) \\ n(K_1+1) \\ \vdots \\ n(K_2-N) \end{bmatrix} = \begin{bmatrix} y(K_1+N) \\ y(K_1+N+1) \\ \vdots \\ y(K_2) \end{bmatrix},$$

where
   s(i) comprises an $i^{th}$ component of the known portion;
   ch(i) comprises an $i^{th}$ component of the time domain channel estimate;
   n(i) comprises an $i^{th}$ component of noise;
   r(i) comprises an $i^{th}$ component of the CDMA signal;
   $K_1$ is a starting index of the known portion;
   $K_2$ is an end index of the known portion; and
   N is a number of components in the frequency domain channel estimate.

9. The method of claim 2, wherein adjusting comprises performing a component-wise division of the frequency domain representation of the new CDMA signal by the frequency domain channel estimate.

10. The method of claim 9, wherein the component-wise division is performed only for values of the frequency domain channel estimate which are sufficiently large so as to reduce effects of amplifying noise components of the CDMA signal.

11. The method of claim 9, wherein the component-wise division is performed only for components of the frequency domain channel estimate which have values above a predefined threshold value β.

12. The method of claim 11, further comprising:
   multiplying by β each component of the frequency domain representation of the new CDMA signal for which the corresponding component of the frequency domain channel estimate has a value below β.

13. The method of claim 11, further comprising:
   determining weights for components of the frequency domain channel estimate which have values less than β;
   multiplying by a respective determined weight each component of the frequency domain representation of the new CDMA for which the corresponding component of the frequency domain channel estimate has a value below β.

14. The method of claim 13, wherein determining weights comprises determining the weights ω as $$\omega = (E_\psi^* E_\psi)^{-1} E_\psi^* d,$$

where $$d = \{d(m)\} = spn(m) - \sum_{k \in \Omega} \frac{rf(k)}{cf(k)} \exp\left(jmk\frac{2\pi}{b}\right);$$

m=0,1, . . . ,$a_i$
a is a length of the known portion;
b is a length of a portion of the CDMA signal to be equalized;
spn(m) comprises an $m^{th}$ component of the known portion;
rf(k) comprises a $k^{th}$ component of the frequency domain representation of the new CDMA signal;
cf(k) comprises a $k^{th}$ component of the frequency domain channel estimate;

$E_\Psi$ comprises a matrix formed by both rf(k) and $$\exp\left(jmk\frac{2\pi}{b}\right)$$

for k∈Ψ and m=0,1, . . . ,a, and Ψ comprises indices of the components of the frequency domain channel estimate having values less than β.

15. The method of claim 1, further comprising:
performing a frequency domain to time domain conversion on the frequency domain representation of an equalized signal to produce a time domain equalized signal.

16. The method of claim 15, further comprising:
performing further processing on the time domain equalized signal, the further processing comprising at least one of de-scrambling and normal CDMA decoding.

17. The method of claim 1, wherein the known portion comprises at least one of a preceding known portion preceding the data portion and a succeeding known portion following the data portion.

18. The method of claim 1, wherein the known portion comprises at least one of pilot channel signalling and MAC (Media Access Control) channel signalling.

19. The method of claim 1, wherein the CDMA signal comprises 1024 chips, including two data blocks of 400 chips each as the data portion, preceding and succeeding MAC blocks of 64 chips each which precede and follow the data portion, respectively, and preceding and succeeding pilot blocks of 48 chips each which precede and follow the data portion, respectively, as the known portion.

20. The method of claim 1, wherein the data portion of the CDMA signal comprises frequency domain components.

21. A computer program product comprising instructions which when executed perform the method of claim 1.

22. The method of claim 1, implemented at a receiver, further comprising:
multiplexing the data portion and the known portion into the CDMA signal at a transmitter; and
transmitting the CDMA signal from the transmitter to the receiver.

23. The method of claim 22, wherein multiplexing comprises:
assisting in translating from the linear convolution to the cyclic convolution at the receiver end by:
generating frequency domain components from information to be transmitted;
performing a frequency domain to time domain conversion on the frequency domain components to produce time domain components; and
multiplexing the time domain components into the CDMA signal to form the data portion.

24. The method of claim 23, wherein multiplexing comprises:
generating frequency domain components from information to be transmitted; and
multiplexing the frequency domain components into the CDMA signal to form the data portion.

25. A communication signal processing method comprising:
multiplexing a data portion and a known portion comprising a known or repeated data sequence into a CDMA signal; and
outputting the CDMA signal for transmission to a receiver over a multipath communication channel and equalization at the receiver by determining from the known portion a channel estimate of the communication channel, translating the CDMA signal into a new CDMA signal which comprises a cyclic convolution with the channel estimate, and adjusting a frequency domain representation of the new CDMA signal using the channel estimate to produce a frequency domain representation of an equalized signal.

26. The method of claim 25, wherein multiplexing comprises:
multiplexing frequency domain components representing the data into the CDMA signal.

27. A system for equalizing a portion of a CDMA signal received over a multipath communication channel, the CDMA signal having a data portion and a known portion comprising a known or repeated data sequence and representing a linear convolution between the multipath channel and a transmitted CDMA signal, the system comprising:
an input; and
a processor configured to receive the CDMA signal from the input, to determine from the known portion a channel estimate of the communication channel, to translate the CDMA signal into a new CDMA signal which comprises a cyclic convolution with the channel estimate, and to adjust a frequency domain representation of the new CDMA signal using the channel estimate to produce a frequency domain representation of an equalized signal.

28. The system of claim 27, wherein the processor is configured to determine the channel estimate by determining a time domain channel estimate from the known portion, to perform a time domain to frequency domain conversion on the time domain channel estimate to produce a frequency domain channel estimate, and to adjust the frequency domain representation of the new CDMA signal using the frequency domain channel estimate.

29. The system of claim 28, wherein the processor implements a transform engine for performing the time domain to frequency domain conversion.

30. The system of claim 28, wherein the processor is further configured to translate the CDMA signal by subtracting the known portion from the CDMA signal to produce the new CDMA signal.

31. The system of claim 28, wherein the processor is further configured to translate the CDMA signal by replacing at least some of the known portion with a new portion which converts the CDMA signal to the new CMDA signal which is a cyclic convolution with the time domain channel estimate.

32. The system of claim 31, wherein the processor is further configured to generate the new portion of the CDMA signal as $$z(n) = \sum_{k=0}^{n} spn(k)ch(n-k) + \sum_{k=1024-N+n}^{1023} spn(k)ch(1024+n-k) \text{ for } n = 0:N-1,$$

where
N is selected to cover a targeted delay spread and the interference effects;
spn(k)={spn(0), spn(1), . . . ,spn(47)} and {spn(975),spn(976), . . . ,spn(1023)} comprises pilot scrambling code segments for pilot signalling comprising the known portion; and ch(k)=ch(0),ch(1), . . . ,ch(N) comprises the time domain channel estimate.

33. The system of claim 31, wherein the processor is further configured to adjust the frequency domain representation of the new CDMA signal by performing a component-wise division of the frequency domain representation of the new CDMA signal by the frequency domain channel estimate.

34. The system of claim 33, wherein the processor is further configured to perform the component-wise division only for components of the frequency domain channel estimate which have values above a predefined threshold value.

35. The system of claim 34, wherein the processor is further configured to multiply by the predefined threshold value each component of the frequency domain representation of the new CDMA signal for which the corresponding frequency domain channel estimate has a value below the predefined threshold value.

36. The system of claim 34, wherein the processor is further configured to multiply by a respective weight each frequency domain representation of the new CDMA signal for which the corresponding component of the frequency domain channel estimate which has a value below the predefined threshold value.

37. The system of claim 28, wherein the processor is configured to adjust the frequency domain representation of the new CDMA signal by removing the effect of the channel as represented by the frequency domain channel estimate from the frequency domain representation of the new CDMA signal.

38. The system of claim 28, wherein the processor is further configured to translate the CDMA signal by removing ISI (inter-symbol interference) effects from the CDMA signal using the time domain channel estimate to produce the new CDMA signal.

39. The system of claim 28, wherein the processor is configured to determine the time domain channel estimate by solving:

$$\begin{bmatrix} s(K_1) & s(K_1+1) & \cdots & s(K_1+N) \\ s(K_1+1) & s(K_1+2) & \cdots & s(K_1+N+1) \\ \cdots & \cdots & \cdots & \cdots \\ s(K_2-N) & s(K_2-N+1) & \cdots & s(K_2) \end{bmatrix} \begin{bmatrix} ch(N) \\ ch(N-1) \\ \vdots \\ ch(0) \end{bmatrix} + \begin{bmatrix} n(K_1) \\ n(K_1+1) \\ \vdots \\ n(K_2-N) \end{bmatrix} = \begin{bmatrix} y(K_1+N) \\ y(K_1+N+1) \\ \vdots \\ y(K_2) \end{bmatrix},$$

where s(i) comprises an $i^{th}$ component of the known portion;
ch(i) comprises an $i^{th}$ component of the time domain channel estimate;
n(i) comprises an $i^{th}$ component of noise;
r(i) comprises an $i^{th}$ component of the CDMA signal;
$K_1$ is a starting index of the known portion;
$K_2$ is an end index of the known portion; and
N is a number of components in the frequency domain channel estimate.

40. The system of claim 27, wherein the processor is further configured to perform a frequency domain to time domain conversion on the frequency domain representation of an equalized signal to produce a time domain equalized signal.

41. The system of claim 27, wherein the known portion comprises at least one of a preceding known portion preceding the data portion and a succeeding known portion following the data portion.

42. The system of claim 27, wherein the CDMA signal comprises an 1xEV-DO signal.

43. The system of claim 27, further comprising:
a memory,
wherein the processor is further configured to store a portion of the CDMA signal in the memory.

44. The system of claim 27, implemented at a receiver in a communication system, the communication system further comprising:
a transmitter comprising an input and a processor configured to receive from the input data for transmission to the receiver, to multiplex the data and the known or repeated data sequence to form the data portion and the known portion of the CDMA signal, and to output the CDMA signal for transmission from the transmitter to the receiver.

45. The system of claim 44, wherein the processor is further configured to assisting in translating from the linear convolution to the cyclic convolution at the receiver end by generating frequency domain components from the data, and to multiplex the frequency domain components to form the data portion of the CDMA signal.

46. A communication signal processing system comprising:
an input for receiving data to be transmitted; and
a processor configured to receive the data from the input, to multiplex the data and a known or repeated data sequence into a CDMA signal to form a data portion and a known portion, and to output the CDMA signal for transmission to a receiver over a multipath communication channel and equalization at the receiver by determining from the known portion a channel estimate of the communication channel, translating the CDMA signal into a new CDMA signal which comprises a cyclic convolution with the channel estimate, and adjusting a frequency domain representation of the new CDMA signal using the channel estimate to produce a frequency domain representation of an equalized signal.

47. The system of claim 46, wherein the processor is configured to multiplex the data into the CDMA signal by multiplexing frequency domain components representing the data into the CDMA signal.

48. A CDMA communication system comprising:
communication equipment comprising a processor configured to receive from an input data to be transmitted, to multiplex the data and a known or repeated data sequence into a CDMA signal to form a data portion and a known portion, and to output the CDMA signal for transmission; and
communication equipment comprising a processor configured to receive the CDMA signal over a multipath communication channel, to determine from the known portion a channel estimate of the communication channel, to translate the CDMA signal into a new CDMA signal which comprises a cyclic convolution with the channel estimate, and to adjust a frequency domain representation of the new CDMA signal using the channel estimate to produce a frequency domain representation of an equalized signal.

49. The communication system of claim 48, wherein at least one network element of the communication system comprises the communication equipment comprising a processor configured to receive from an input data to be transmitted.

50. The communication system of claim 48, wherein at least one network element of the communication system comprises the communication equipment comprising a processor configured to receive the CDMA signal.

51. The communication system of claim 48, wherein at least one communication terminal adapted for operation in the communication system comprises the communication equipment comprising a processor configured to receive the CDMA signal.

52. The communication system of claim 48, wherein at least one communication terminal adapted for operation in the communication system comprises the communication equipment comprising a processor configured to receive from an input data to be transmitted.

* * * * *

UNITED STATES PATENT AND TRADEMARK OFFICE
CERTIFICATE OF CORRECTION

PATENT NO. : 7,319,690 B2  
APPLICATION NO. : 10/912241  
DATED : January 15, 2008  
INVENTOR(S) : Shiquan Wu, Wen Tong and Claude Royer It is certified that error appears in the above-identified patent and that said Letters Patent is hereby corrected as shown below:

Column 9, line 25, "n(r)" should read -- n(t) --

Column 9, line 45, "$N_r$" should read -- $N\tau$ --

Column 9, line 50, "$N_r$" should read -- $N\tau$ --

Column 9, line 65, "$N_r$" should read -- $N\tau$ --

Column 15, claim 7, equation, "$k=1024-N-n$" should read -- $k=1024-N+n$ --

Signed and Sealed this

Twenty-sixth Day of August, 2008

JON W. DUDAS  
*Director of the United States Patent and Trademark Office*